United States Patent
Andreev et al.

(10) Patent No.: US 7,221,458 B2
(45) Date of Patent: May 22, 2007

(54) METHOD FOR MEASURING THE MICRORELIEF OF AN OBJECT AND OPTICAL CHARACTERISTICS OF NEAR-SURFACE LAYER, MODULATION INTERFERENCE MICROSCOPE FOR CARRYING OUT SAID METHOD

(76) Inventors: Vladimir A. Andreev, ul, Akademika Vargi, d. 2, kv, 252, Moscow (RU); Konstantin V. Indukaev, prospect Mira, d. 52, kv. 43, Moscow (RU); Pavel A. Osipov, ul, Festivaluaya, d. 63, korp. 2, kv. 147, Moscow (RU)

( * ) Notice: Subject to any disclaimer, the term of this patent is extended or adjusted under 35 U.S.C. 154(b) by 310 days.

(21) Appl. No.: 10/466,351

(22) PCT Filed: Jan. 23, 2001

(86) PCT No.: PCT/RU01/00024

§ 371 (c)(1),
(2), (4) Date: Jan. 14, 2004

(87) PCT Pub. No.: WO02/056083

PCT Pub. Date: Jul. 18, 2002

(65) Prior Publication Data
US 2004/0119984 A1 Jun. 24, 2004

(30) Foreign Application Priority Data
Jan. 15, 2001 (RU) .............................. 2001100698

(51) Int. Cl.
*G01B 9/02* (2006.01)
*G01B 11/02* (2006.01)

(52) U.S. Cl. ....................... 356/495; 356/512

(58) Field of Classification Search ................ 356/489, 356/491, 492, 495, 511–515
See application file for complete search history.

(56) References Cited

U.S. PATENT DOCUMENTS 4,869,593 A * 9/1989 Biegen ........................ 356/495
6,721,094 B1 * 4/2004 Sinclair et al. .............. 356/450

FOREIGN PATENT DOCUMENTS

RU 2029976 * 2/1995

OTHER PUBLICATIONS

Phase-mpa measurements by interferometry with sinusoidal phase modulation and four integrating buckets, Dubois, Journal of the Optical Society of America, Aug. 2001, pp. 1972-1979.*
Modulation Interference Microscope, Osipov, SPIE, vol. 5067, 2003, pp. 227-233.*

* cited by examiner

*Primary Examiner*—Gregory J. Toatley, Jr.
*Assistant Examiner*—Patrick J. Connolly
(74) *Attorney, Agent, or Firm*—McDermott Will & Emery LLP

(57) ABSTRACT

Method of optical measuring the microrelief of an object using a modulation interference microscope. An input coherent monochromatic polarized light flux is split into an object light beam exposing the object and a reference beam. The light flux intensity is redistributed between the object and reference beams. Thereafter, polarization modulation is performed separately for the object beam and the reference beam. The polarized object beam is reflected onto the object plane to expose the object field. Amplitude modulation is performed by changing the intensity ratio between the object beam and the reference beam. A fraction of the light at a pixel caused by the object beam with respect to the total light falling on the pixel is determined.

12 Claims, 7 Drawing Sheets

METHOD FOR MEASURING THE MICRORELIEF OF AN OBJECT AND OPTICAL CHARACTERISTICS OF NEAR-SURFACE LAYER, MODULATION INTERFERENCE MICROSCOPE FOR CARRYING OUT SAID METHOD

TECHNICAL FIELD

The invention relates to the optics and particularly to the methods for determining a microrelief and distribution of optical material constants of a surface layer of the object and can be used for investigations in the microelectronics, nanotechnology, material science, medicine, and biology.

BACKGROUND ART

A method for visualizing an object microrelief is known, which method includes steps of: exposing the microobject field to a coherent, monochromatic radiation, and converting the radiation reflected from the object into electrical signals corresponding to image points (USSR Author's Certificate No 1734066, Int. Cl. G02B 21/00, 1992).

This method allows to achieve a spatial resolution exceeding significantly the resolution limit of classical amplitude microscopes.

However, it allows to obtain high spatial resolution only for a small number of relatively simple objects being monomaterial and having simple geometry.

The disadvantages of said method are as follows:
 it is impossible to interpret sensibly an object phase image, even with a moderate resolution, in the presence of materials at the object surface, having different optical parameters;
 it is impossible to investigate highly informative distribution of optical material constants of the microobject surface layer.

A micro-ellipsometer is known, which allows to perform a method for determining the object microrelief and surface layer optical features (Interferometrical Profilometry at Surfaces with Varying Materials, H. Jennewein, H. Gottschling, T. Ganz and T. Tschudi, Proceedings of SPIE: Metrology, Inspection and Process Control for Microlithography XIII, Vol. 3677 II (1999) p. 1009).

In the known method parameters of the microobject relief and a complex refractive index of the surface layer are measured simultaneously. The method allows to take into account and compensate for the particular case of stepped relief the effect of value of local complex refractive index to nominal values of relief height.

The disadvantages of this known method are as follows:
 it has a low lateral resolution both in regard to the distribution of the refractive index and in regard to the relief parameters;
 it is impossible to perform a procedure of the simultaneous research of the material and geometrical parameters for the common type relieves and for optically anisotropic materials;
 the mentioned method has a low accuracy in determining optical constants.

The method closest to the proposed one by the technical essence is a method for determining the object microrelief and optical properties of the surface layer, which method includes steps of: performing a polarization modulation; splitting an input coherent, monochromatic polarized light flux into an object light beam exposing the object field through the microlens, and a reference light beam; performing a phase modulation of the reference beam; performing an interference mixing of the light beams; extracting two mutually orthogonal components of the polarization and obtaining an interferogram; selecting a minimum fragment (pixel) of said interferogram; converting an average illumination of said fragment into respective electric signals; determining phases and amplitudes of a variable component of the phase modulation signal; calculating the values of phases, amplitudes and polarization parameters of the light falling onto the pixel from the object beam; and calculating optical material constants of the surface layer of the object (Russian Patent No. 2029976, Int. Cl. G02B 21/00, 1995).

However, the known method has a low accuracy in determining the optical constants due to impossibility to ensure an exposure of the object to a polarized light with a high extinction, and in the case of dark and poorly reflecting objects this method has a low spatial resolution in determining both the relief parameters and optical material constant distribution caused by absence of possibility to equalize the pixel exposures from the reference and object beams.

The device closest to the proposed one by the technical essence is a modulation interference microscope comprising: a laser, a phase modulator, a polarization modulator, and also a telescope, analyzer and photodetector mounted along a single optical axis, and a control generator, a signal processing unit, a controller designed to be connected to a computer through an exchange bus. The signal processing unit comprises a meter of the signal variable component amplitude and a phase meter (Russian Patent No 2029976, Int. Cl. G02B 21/00, 1995).

However, the known microscope does not allow a high accuracy in measuring the optical constants due to a low extinction of the electrooptical polarization modulator, and additional decreasing of that extinction at the cost of twofold passing of the light beams through the lens system of the microlens and lack of possibility to ensure the optimum mode of modulation.

The known microscope has the resolution levels unbalanced by the phase and polarization, which does not allow to obtain a high spatial resolution of the optical constant distribution. The known microscope does not allow to perform the controlled redistribution of the light intensity in the object and reference beams, which does not allow to equalize the given pixel exposure from said beams, thereby decreasing the relative value of the modulation signal variable component and deteriorating all parameters of accuracy and resolution.

This disadvantage is particularly actual for dark objects and for objects having poorly reflecting surface, for example, for fluids.

SUMMARY OF THE DISCLOSURE

The technical problems solved by the proposed invention are to increase the spatial resolution when determining the geometrical parameters of the relief and distribution of the material optical constants, to increase the number of constants being determined including the optical anisotropy constants, to increase significantly the accuracy of material constant determination, and to expand the range of objects being investigated.

The technical result in the present invention is achieved by providing a method for determining the object microrelief and optical properties of the surface layer, which method including steps of: performing a polarization modulation; splitting an input coherent, monochromatic polarized light flux into an object light beam exposing the object field through the microlens, and a reference light beam; performing a phase modulation of the reference beam; performing an interference mixing of the light beams; extracting two mutually orthogonal polarization components and obtaining an interferogram; selecting a minimum fragment (pixel) of said interferogram; converting an average illumination of said fragment into respective electric signals; determining phases and amplitudes of a variable component of the phase modulation signal; calculating the values of phases, amplitudes and polarization parameters of the light falling onto the pixel from the object beam; and calculating optical material constants of the surface layer of the object, wherein according to the invention, the method includes steps of: simultaneously with the step of splitting the light flux into the object and reference beams, performing the controlled redistribution of the light flux intensity between these beams; performing the polarization modulation separately for the object beam and the reference beam; the object field exposure being performed by passing the object beam through a front surface of the frontal lens of the microlens from inside, and performing the interference mixing of the light beams; before measuring, a preliminary ratio of illumination between the reference and object beams is established, and preliminary phase and amplitude values of the light falling onto the pixel from the object beam are calculated; after repeating the operation for the whole set of pixels, performing a step of equalizing the illumination of one pixel separately from the object and reference beams by redistributing the intensity in these beams; measuring the phase and amplitude of the modulation signal variable component; and calculating a refined phase and amplitude value of the light falling on the pixel from the object beam.

The invention is also characterized by that the exposure of the object field is performed sequentially in two linearly independent polarization conditions.

While using a polarization analyzer, this allows to obtain the following microobject characteristics:

a distribution of vector of a local normal and microobject heights, a distribution of complex refractive index for isotropic objects, an orientation of an optical axis and values of the complex refractive indices for one-axis two-beam-refracting materials excluding the case of vertical locating of the optical axis.

The invention is also characterized by further steps of: performing an additional refinement of the amplitude value of the light falling onto the pixel from the object beam by setting the phase of the reference beam light in antiphase with the light falling onto the pixel from the object beam; performing the amplitude modulation by changing the intensity ratio of the object and reference light beams; determining two different intensity ratios corresponding to the same illuminations of the pixel; and calculating a fraction of the light falling onto the pixel from the object beam.

This allows to improve the accuracy in determining the optical material constants at the cost of improving the accuracy in determining the reflective index and to improve the spatial resolution of said constant distribution.

The invention is also characterized by further steps of: setting additionally the object beam phase in phase with the light falling onto the pixel from the object beam; performing the polarization modulation of the object beam continuously; measuring the polarization modulation signal; and calculating phases and amplitudes of harmonic components of said polarization modulation signal, by which phases and amplitudes are calculated the parameters of optical anisotropy of the object surface layer.

This allows to determine the full set of optical material constants including a determination of parameters of the optical anisotropy of any nature.

The invention is also characterized by further steps of: performing the polarization modulation of the object beam and reference beam with a simultaneous phase modulation of said reference beam, a frequency of the object beam phase modulation being either higher or lower than the frequency of the polarization modulation of the beams; measuring the phases and amplitudes of the harmonic components of the signal envelopes; and calculating the optical material constants including the parameters of optical anisotropy of the object surface layer.

This gives a possibility to research, within the context of a single procedure, both isotropic and anisotropic microobjects without a priori assumptions on the character of the optical anisotropy, and to ensure a frame inputting time saving for substantially anisotropic microobjects.

The technical result in the proposed invention is achieved by providing a modulation interference microscope, comprising: a laser; a modulation interferometer having a phase modulator, collimator optically connected with a polarization modulator, and a beam splitter; a microlens, telescope, polarization analyzer unit and photodetector mounted along a single optical axis; a controlling and signal processing unit designed to be connected to a computer through an exchange bus, which microscope according to the invention further comprises: a spatial micro-aperture filter; an element designed for deflecting and mixing the light beams and located on the same optical axis; the modulation interferometer being added with a second collimator optically connected with a second polarization modulator by means of a system of deflecting optical elements, and a phase compensator; the beam splitter being made adjustable and coupled in series through the deflecting optical elements of the system by one output with the phase modulator, the polarization modulator, the collimator and one side of the element designed for deflecting and mixing the light beams, and by other output with the phase compensator, the second polarization modulator, the second collimator and an opposite side of said element.

Making the element designed for deflecting and mixing the light beams in the form of two-sided flat mirror placed at an angle to the optical axis ensures an illumination of the object and simultaneous deflection of the reference beam for mixing with the object one, thereby simplifying the modulation interferometer structure.

Making the mirror translucent partially eliminates a shading of rays of the object beam going from the object near the optical axis.

An opaque mirror eliminates the mutual parasite illumination of the beams.

The invention is also characterized in that the element designed for deflecting and mixing the light beams is located inside the frontal lens of the microlens.

This allows to supply a polarized light with a high extinction from the polarization modulator bypassing the microlens system of lenses, thereby allowing to improve radically the accuracy in determining the optical material constants.

Making the polarization modulator in the form of the linear polarization filter, controlled compensator and polarization plane rotating unit, which are optically connected and located in series, allows to form any polarization condition in the beams and to change this state in time according to an arbitrary rule expanding the possibilities of an optimum selection of a modulation scheme corresponding to the given object.

Locating the phase modulator at an angle to the optical axis being different from the right one, and supplying the interferometer additionally with at least one turning mirror placed between the phase modulator and one of the elements of the system of deflecting optical elements allows to reduce overall construction dimensions.

BRIEF DESCRIPTION OF THE DRAWINGS

The essence of the proposed invention will be explained by the following description of the method for determining the object microrelief and optical properties of the surface layer, and structure of the modulation interference microscope for the method realization, and by drawings, in which.

DETAILED DISCLOSURE OF THE EMBODIMENTS

Figure 1:
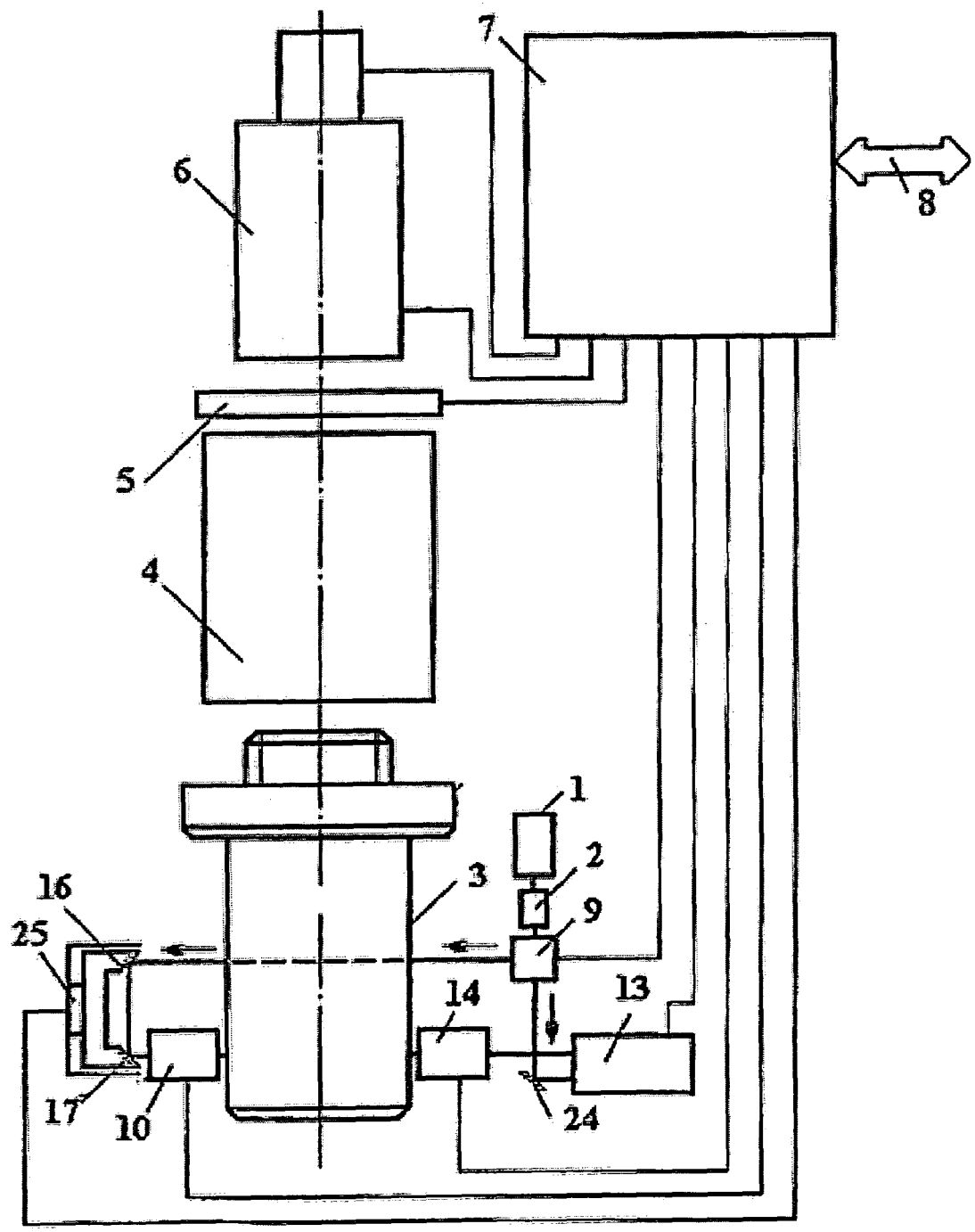
FIG. 1 shows a diagram of the modulation interference microscope.

As shown in FIG. 1, a proposed modulation interference microscope comprises a laser 1, a spatial micro-aperture filter 2, a modulation interferometer, a microlens 3, a telescope 4, a polarization analyzer unit 5, a photodetector 6, elements 3 to 6 being located along a single optical axis, a controlling and signal processing unit 7 designed to be connected to a computer (not shown) through an exchange bus 8.

The spatial micro-aperture filter 2 ensures a unification of the phase wave front, thereby increasing an accuracy of all phase measurements while ensuring an improvement of spatial resolution parameters and an accuracy in determining the material optical constants.

The modulation interferometer consists of a adjustable beam splitter 9, a phase compensator, a polarization modulator 10 optically connected with a collimator 11, an element 12 designed for deflecting and mixing the light beams, a phase modulator 13 and a second polarization modulator 14 optically connected with a second collimator 15 of the system of deflecting optical elements.

The second collimator 15 ensures a possibility of an independent modulation of beams and their precision matching after the reflection of the object beam from the object.

A system of deflecting optical elements consists of six flat mirrors 16, 17, 18, 19, 20, 21 and a mirror 22 element that can be made translucent. The mirror 22 is placed between the phase modulator 13 and the polarization modulator 14 and is optically coupled with the adjustable beam splitter 9.

Figure 3:
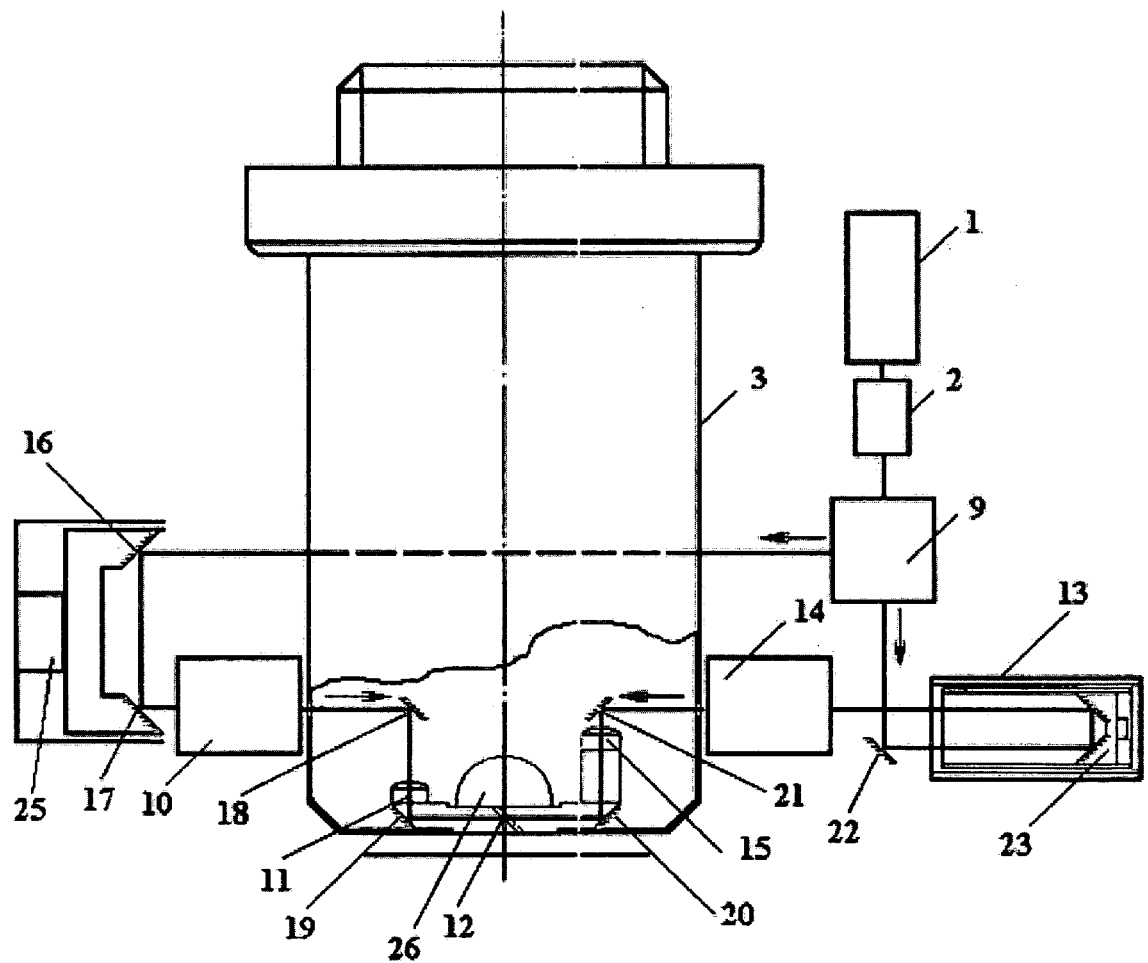
FIG. 3 shows a diagram of the modulation interferometer with the phase modulator having the corner turning-round mirror.

As shown in FIG. 3, in the case of making the mirror 22 non-transparent, a mirror 23 of the phase modulator 13 is made turning-round in the form of a pair of mutually orthogonal flat mirrors or a corner reflector (not shown).

Figure 2:
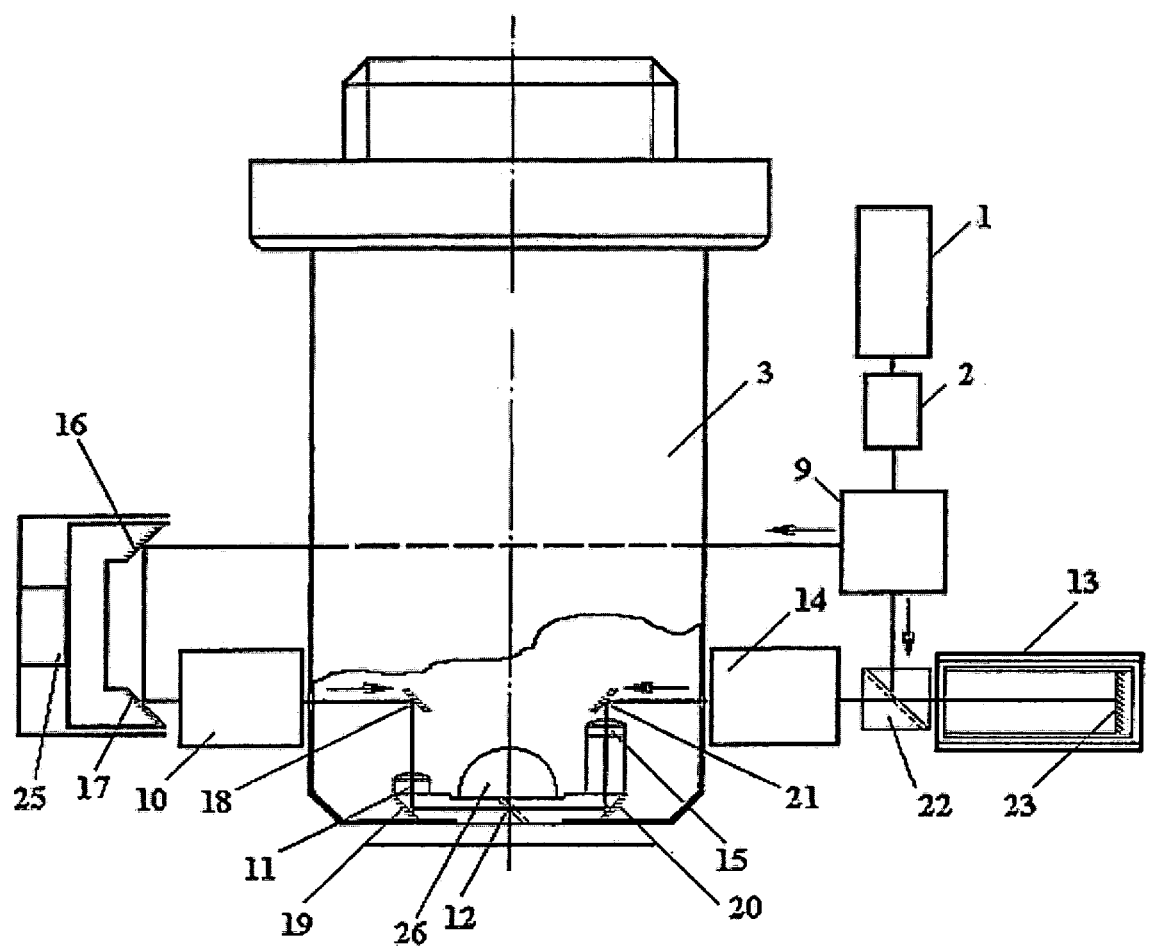
FIG. 2 shows a diagram of the modulation interferometer with the phase modulator having the flat mirror.

As shown in FIG. 2, in the case of making the mirror 22 translucent, the mirror 23 of the phase modulator 13 is made in the form of a flat mirror.

Figure 4:
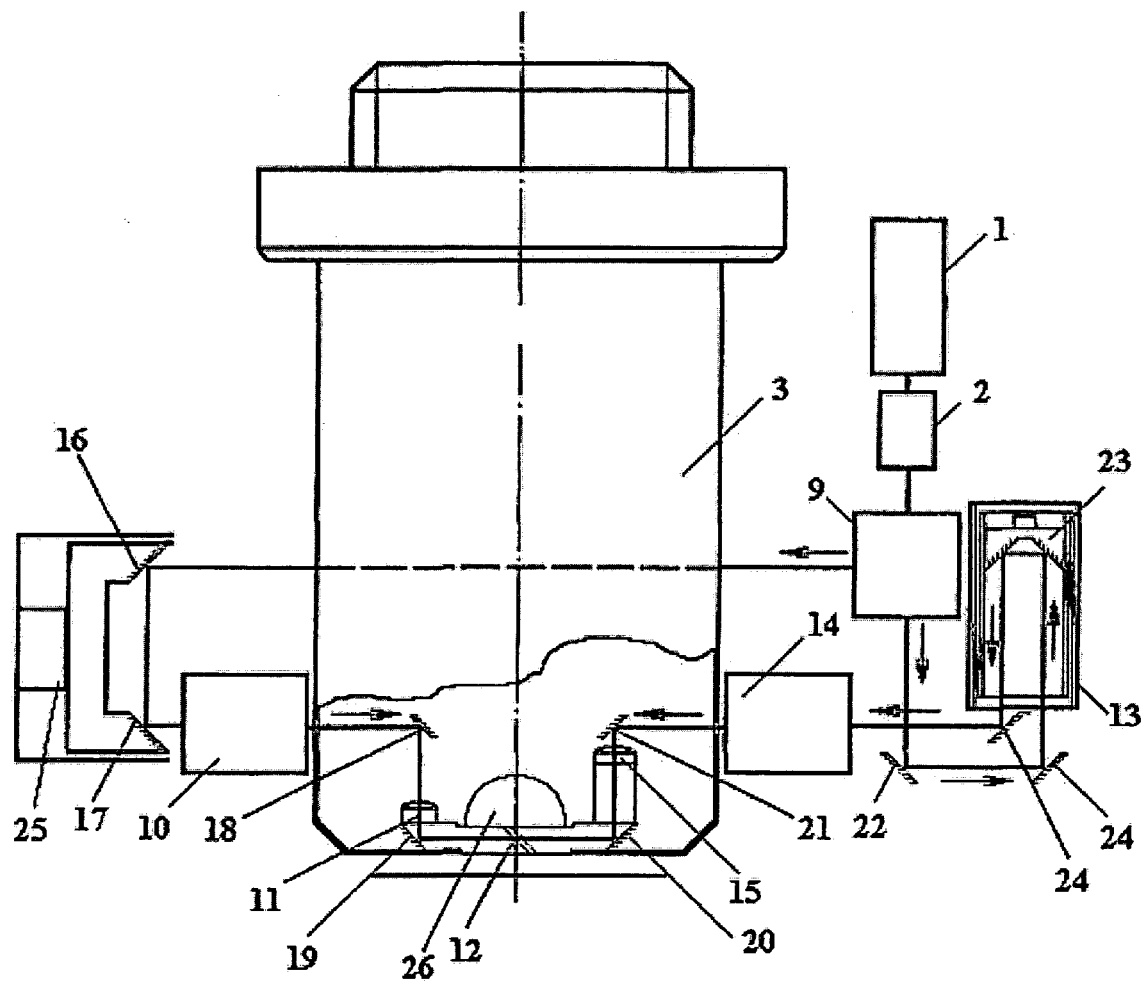
FIG. 4 shows a diagram of the modulation interferometer with the phase modulator having the corner turning-round mirror, the modulator is placed parallel to an optical axis.
Figure 5:
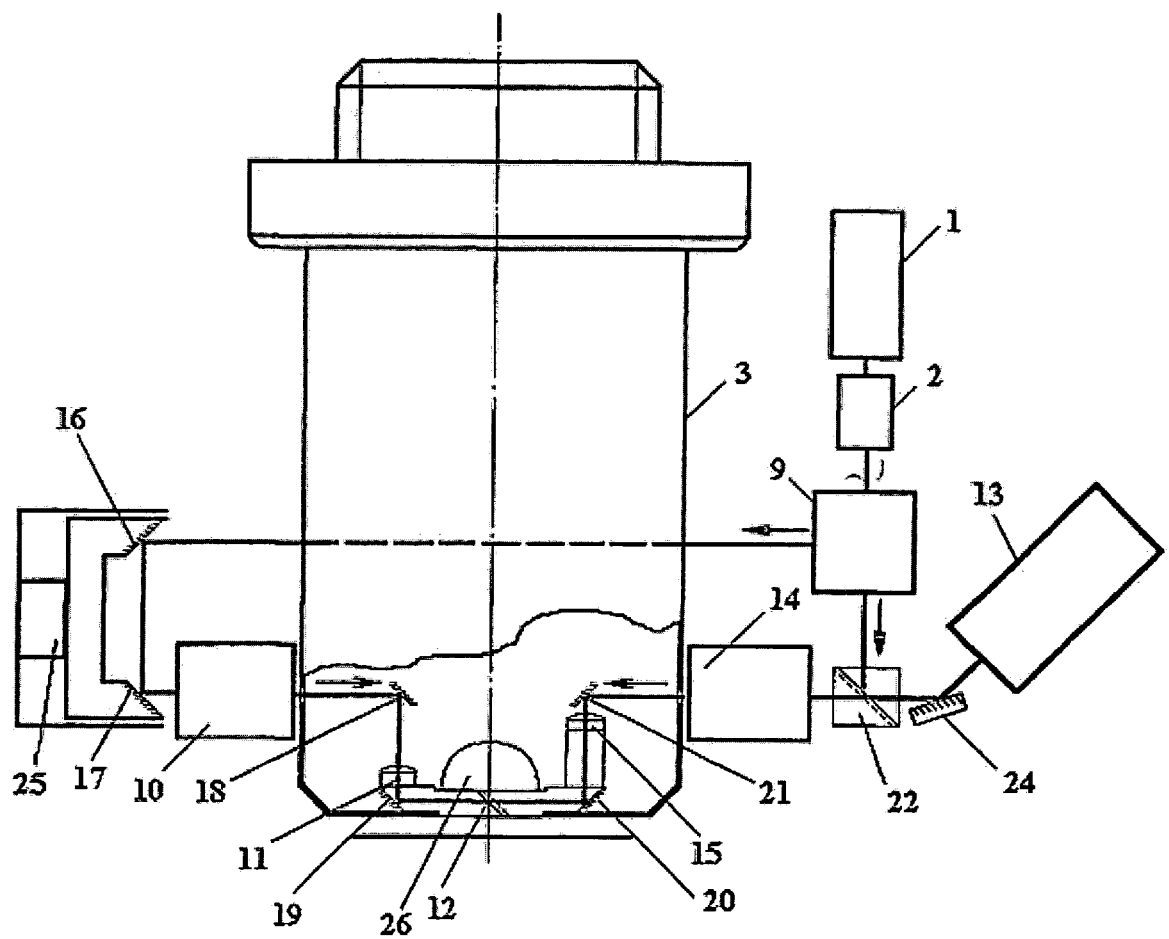
FIG. 5 shows a diagram of the modulation interferometer with the phase modulator having the flat mirror, the modulator is placed at an angle to the optical axis.

As illustrated in FIGS. 4 and 5, the phase modulator 13 can be located at an angle to the optical axis different from the right one. In this case the modulation interferometer is additionally provided with at least one turning mirror 24 placed between the mirror 22 element being one of the elements of the system of deflecting optical elements and the phase modulator 13.

Providing with two turning mirrors is necessary in the case of making the mirror 23 of the phase modulator in the form of a pair of mutually orthogonal flat mirrors or a corner reflector (FIG. 5).

The mirrors 16 and 17 inclined to each other at the right angle and provided with a linear movement drive 25 along the bisector of said right angle constitute the phase compensator.

In this construction, the phase compensator allows to equalize precisely optical path lengths of the modular interferometer beams as well as to compensate the Pancharantnam phase appearing in forming a polarization condition different from the linear one.

The beam splitter 9 is connected in series by one of it outputs through the mirrors 16 and 17 of the phase compensator with the polarization modulator 10, through the mirror 18 with the collimator 11, and through the mirror 19 with the lower side of the element 12. The above-mentioned components in the aggregate form an object shoulder of the interferometer.

Other output of the beam splitter 9 in the case of the translucent mirror 22 is coupled through this mirror with the phase modulator 13 and second polarization modulator 14, through the mirror 20 with the second collimator 15, and through the mirror 21 with the upper side of the element 12.

In the case of making the mirror 22 opaque, between this mirror and the phase modulator 13 at least one deflecting mirror 24 is additionally located.

The above-mentioned components form a reference shoulder of the interferometer.

The mirrors 18 and 19 along with the mirrors 20 and 21 are located pairwise so that sections of the optical axes of the reference and object shoulders from the mirror 19 to the lower surface of the element 12 and from the mirror 21 to the upper surface of the element 12 are collinear.

Making and locating the element 12 designed for deflecting and mixing the light beams can be different depending on the type of objects being investigated, for example, on the structure and features of the material etc.

The presence of the reference and object beams in the structure of the element 12 for coherent mixing the light beams, located separately from the beam splitter, allows to perform independently the polarization modulation separately from both reference and object beams, thereby expanding the possibilities of the polarization modulation.

The element 12 designed for deflecting and mixing the light beams is located within the microlens 3, for example, inside the frontal lens 26, and is made in the form of a flat mirror, and is placed at an angle to the optical axis, for example, 45°.

The frontal lens 26 of the microlens 3 consists of several parts, at least of two parts, forming an undetachable joint which plane matches the element 12 plane.

Figure 8:
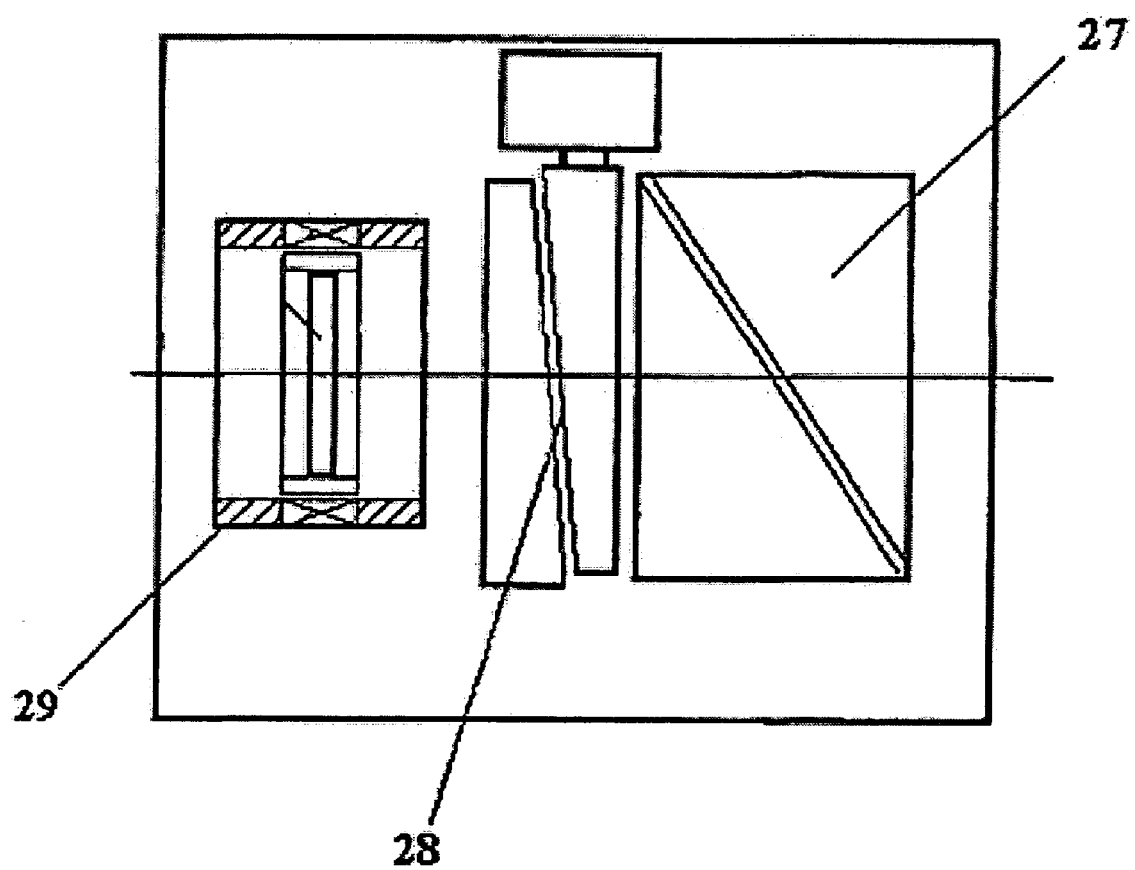
FIG. 8 shows a diagram of the polarization modulator.

The polarization modulators 10 and 14 have the similar structure illustrated in FIG. 8, and are made in the form of a linear polarization filter 27, a controlled polarization compensator 28 and a polarization plane rotating unit 29, which are optically connected and arranged in series.

A known in the art Babine-Soleil compensators with the linear electromechanical servo can be utilized as the controlled polarization compensator 28.

A known in the art half-wave plate with the electromechanical rotating servo can be utilized as the polarization plane rotating unit 29.

The beam splitter 9 is made adjustable and consists from a polarizing beam splitter and a polarization plane rotator made, for example, in the form of half-wave plate with an electromechanical rotating servo.

This allows, by means of equalizing an illumination of every pixel from the object and reference shoulders, to ensure a maximum modulation factor and, consequently, an optimum signal/noise ratio independently from the object local lightness, thereby increasing the parameters of accuracy and resolution for poorly reflecting objects.

The collimators 11 and 15 are identical and located so that the sum of optical paths from the collimator 11 to the lower surface of the element 12 and twofold optical path from the lower surface of the element 12 to the object plane is equal to an optical path from the collimator 15 to the upper surface of the element 12.

The adjustable beam splitter 9, the polarization modulator 10, the phase modulator 13, the second polarization modulator 14, the phase compensator, the polarization analyzer unit 5 and a photodetector 6 are connected with the controlling and signal processing unit 7.

In this way, the controlling and signal processing unit 7 can comprise an amplitude meter and phase meter of the variable component and a magnitude meter of the constant component, and a controller (not shown).

The modulation interferometer can be made on a various optic-electromechanical base.

If it is made on the base of classical microscopic elements, then the elements of the modulation interferometer are fully or partially placed outside the microlens 3 (FIG. 2 to FIG. 5).

In this case, the system of deflecting elements is made so that the light part of one of the beams after passing the beam splitter 9 could pass through the microlens 3 laterally either in the space between its lenses or through one of them.

Figure 6:
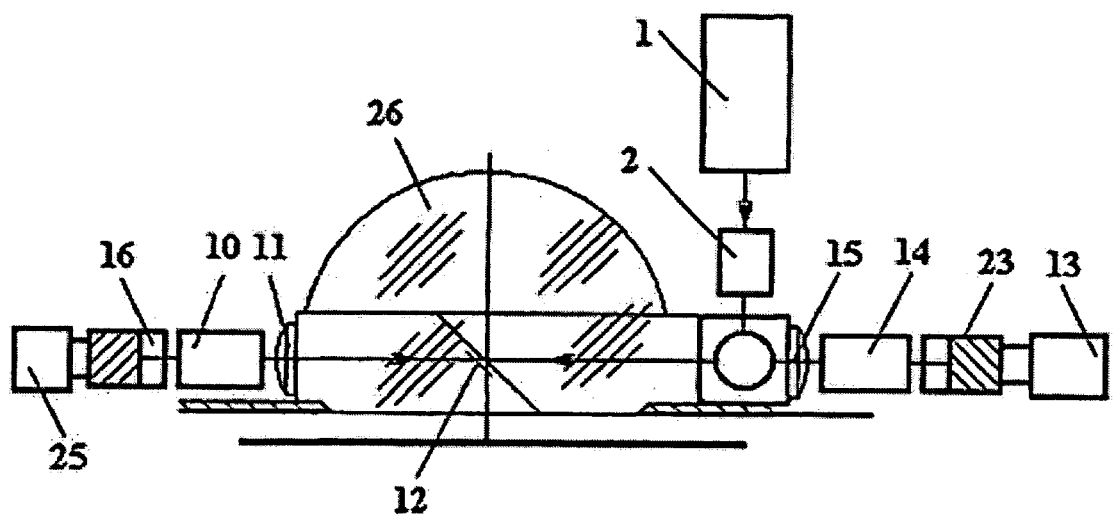
FIG. 6 shows a diagram of the modulation interferometer fully placed within the microlens.
Figure 7:
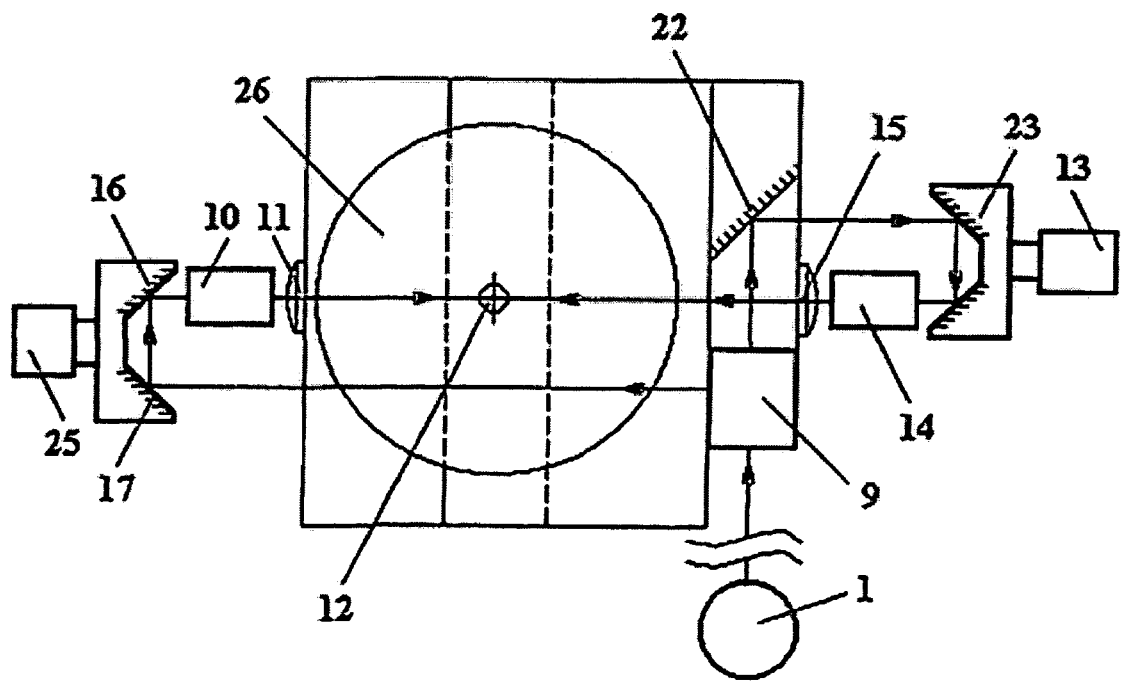
FIG. 7 is a top view of FIG. 6.

FIGS. 6 and 7 schematically show that if the modulation interferometer is made on the base of microelectromechanical system components, then it is fully placed inside the microlens 3 near its frontal lens 26.

In this way, the system of deflecting elements is made so that the light part of one of the beams after passing the beam splitter could pass through the frontal lens laterally.

The proposed modulation interference microscope operates as follows:

The coherent monochromatic linearly polarized light flux being emitted by the laser 1 and passed through the spatial micro-aperture filter 2 is supplied to the adjustable beam splitter 9, where the light flux is split coherently into two beams, the object and reference ones. Every beam propagates along the object and reference shoulders of the modulation interferometer correspondingly.

The light flux power is redistributed between the shoulders in accordance with the known dependence from the angle being set between the polarization vector of the input beam and the axis of polarizing beam splitter.

First, the ratio of intensities in the shoulders is chosen by operator on the basis of medium lightness of the object being investigated, subsequently it is either set default, or chosen automatically for every pixel.

In the latter case, the measured light intensity being reflected by the given fragment of the microlens is taken into account, and the light intensity in the shoulders is redistributed creating the equality of intensities of the light being supplied to the pixel from the reference beam and from the corresponding object fragment.

Then the polarization modulation is performed separately for the object beam and reference beam.

The polarization modulation of the object beam is performed as follows:

The object beam of the light passes sequentially through the mirrors 16 and 17 of the phase compensator, the polarization modulator 10, the mirror 18 and the collimator 11, and the mirror 19 to the lower side of the element 12.

The optical lengths of the optical paths of the object and reference beams are equalized by the phase compensator by means of simultaneous movement of the mirrors 16 and 17.

In the polarization module 10 the object beam, when passing through the linear polarization filter 27, gains a condition of a linear polarization with a high extinction.

In the controlled compensator 28, the condition of the object beam polarization is transferred, in the common case, to the elliptical one with certain determined orientation of the ellipse semi-axes. An additional phase shift appearing by the Pancharantnam phase is compensated with the phase compensator or taken into account in further computer calculations.

Next, with the help of the polarization plane rotating unit 29, the ellipse semi-axes are set to the predetermined position or rotated to any side.

Thus, after passing the polarization modulator, any determined polarization condition is formed in the object beam. The parameters of this condition are changed in time controllably by arbitrary rule.

The polarized object beam of the light in the collimator 11 is formed into a convergent beam which is reflected by the element 12 down onto the object plane. Thus the exposure of object field is performed.

A part of the light of the object beam, which has fallen within the microlens 3 aperture after scattering on the object, is supplied to the photodetector 6 through the telescope 4 and the polarization analyzer unit 5.

The polarization modulation of the reference beam is performed as follows:

The reference beam is supplied through the mirror element 22 to the phase modulator 13, the second polarization modulator 14, through the mirror 20 to the second collimator 15, and through the mirror 21 to the upper side of the element 12.

The phase modulator 13 changes the optical length of the reference beam by means of controlled movement of the mirror 23 of the modulator and performs a change of the reference beam phase by the known time rule.

The second polarization modulator 14 of the reference shoulder is designed and operates similarly to the polarization modulator 10 of the object shoulder, and provides the controlled change of the reference beam polarization condition by the arbitrary rule. The Pancharantnam phase compensation is performed by the phase modulator 13.

The second collimator 15 identical by its optical parameters to the collimator 11 of the object shoulder forms a convergent beam which is supplied to the facing upwards inclined side of the element 12, reflected upwards and supplied to the photodetector 6 through the microlens 3, the telescope 4 and the polarization analyzer unit 5.

An extraction the linear component from every beam occurs in the polarization analyzer unit 5.

Then these components are coherently mixed with each other on the photodetector 6, and an interference pattern representing a two-dimensional lightness distribution being changing in time is formed on this photodetector.

Further, the interference pattern is divided into separate spatial minimal fragments (pixels), and for every of them a conversion of the current medium illumination of the pixel into an alternating electrical signal (modulation signal) is performed by means of deterministic, monotone functional dependence.

The modulation signal is supplied to the controlling and signal processing unit 7, where a measurement of the phase and amplitude of either the modulation signal itself, or its harmonic components, as well as a value of a constant component of the signal is occurred. The results of said measurements are transmitted through the exchange bus 8 to the computer (not shown) for succeeding analysis.

In order to realize the method for determining the object microrelief and the optical properties of the surface layer the following operations are performed:

The operator sets the light intensity ratio in the object and reference beams as $1/R_0$, where $R_0$ is a mean reflecting coefficient of the object fragment being investigated.

A first approximate estimation of $R_0$ is performed when working in white light. A characteristic lineaments are revealed on the surface of the object fragment being investigated.

Then a condition of linear polarization or circular polarization is created in the object beam. For this, by means of the controlled compensator 28, a delay is set to zero for the linear polarization, and to a quarter of a wavelength for the circular polarization.

A direction of the linear polarization vector is selected by the operator with the help of the polarization plane rotating unit 29 taking into account the revealed lineaments.

In initial position, the pixel in positioned in the pattern of the selected fragment.

Then, depending on the character of the polarization condition (linear of circular) set in the object beam, the series of four measurements is performed. All four measurements consist of the phase modulation and measurements of the modulation signal parameters, and differ from each other only by the condition of the polarization modulators.

In the case of the linear polarization:

1. A polarization condition identical to the one in the object beam is formed in the reference beam. The analyzer unit is set in parallel with the polarization vector in the reference beam.

2. The direction the reference beam polarization vector is changed to the perpendicular to the initial one, the position of the polarization analyzer unit is changed to the perpendicular to the initial one.

3. The object beam polarization vector is set in the position orthogonal to the initial one.

4. The reference beam polarization vector and the polarization analyzer unit are set to the initial position.

In the case of the circular polarization:

1. A polarization condition identical (opposite) to the one in the object beam is formed in the reference beam. The operator sets the analyzer unit either taking into account the revealed lineaments, or arbitrarily.

2. The position of the polarization analyzer unit is changed to the perpendicular to the initial one.

3. The polarization conditions of the object and reference beams are changed to opposite ones.

4. The position of the polarization analyzer unit is changed to the perpendicular to the initial one.

All further measurements of the phase and amplitude excluding measurements with the continuous polarization modulation are also performed according to series of four measurements similar to the mentioned ones.

Using the controlling and signal processing unit 7, a calculation of the phase, amplitude and constant component of the modulation signal is performed. The phase and amplitude of the light fallen onto every given pixel from the object beam are measured in accordance with the results of the mentioned measurements. The abovementioned operations are repeated for every new position of the pixel.

The pixels are sequentially positioned so as to overlap the whole surface of the object fragment being investigated. In this case, the pixels can be positioned in succession, with arbitrary gaps, and also with arbitrary overlap.

Then, using the beam splitter 9, the intensity in the object and reference beams is redistributed so that the designed illumination of the pixel from the reference beam is equal to its illumination from the object beam determined earlier.

Then the phase modulation is again performed for every pixel. Using the controlling and signal processing unit 7, a calculation of the phase and amplitude of the variable component and the value of the constant component of the modulation signal is performed. According to the results of the mentioned measurements, initially refined values of the phases and amplitudes of the light fallen onto every given pixel from the object shoulder are calculated.

After that, using the phase modulator 13, the phase of the reference beam is set in antiphase with the phase of the light fallen onto the given pixel from the object beam, the latter phase being measured in previous operations. The ratio of the light intensities in the beams is set using the adjustable beam splitter 9 so that the designed intensity of the light fallen onto the pixel from the object shoulder achieves the value higher of lower than the intensity value from the reference shoulder.

Then the intensities are redistributed so that the intensity of the pixel illumination achieves again the initial value.

The mentioned operation is repeated several times with different initial values of the pixel illumination.

According to the obtained pairs of values of intensity ratio in the beams, corresponding to a similar sum illumination of the pixel, the value of the mentioned ratio is calculated, corresponding to the equality of the pixel illumination from the object and reference beams, from which value is calculated a secondarily refined value of the amplitude of the light fallen onto the given pixel from the object beam.

The illumination of every pixel from the shoulders is equalized when taken into account the secondarily refined values of illuminations from the object shoulder, and the phase modulation is performed once more, and a secondarily refined values of the phase of the light fallen onto the pixel from the object beam.

According to the set of sequentially refined phases and amplitudes of the light fallen from the object beam onto every pixel, said set being a result of everyone from the sequential series of four measurements corresponding to four various conditions of the polarization modulators and the analyzer, the following parameters of the microobject are calculated:

a distribution of the true heights and vector of the local normal;

a distribution of the complex refractive indices of the surface layer of the microobject material for isotropic objects;

two refractive indices and the orientation of the optical axis for one-axis two-beam-refracting materials (excluding the case of the vertical orientation of that axis);
the Faraday rotating ability.

In order to realize the method, the polarization modulation of the object beam and the reference beam is performed simultaneously with its phase modulation, the reference beam phase modulation frequency being either higher or lower than the beam polarization modulation frequency, and the phases and amplitudes of the harmonic components of variable components of signal envelopes are measured. Except the abovementioned, all parameters of optical anisotropy of every materials are calculated including the refractive indices and orientation of axes of the two-axis crystals.

In both embodiments of the device with the modulation interferometer being located completely or partially within the microlens, the interferometer is a single unit with the modified changeable microlens.

A standard microlens modification consisting in positioning, inside the frontal lens on the way of rays reflected from the object, the mirror element 12 having the area less than 1 percent of the aperture area does not hinder to realize with its help simultaneously any microscopic measurements available for the standard, unmodified microlens.

Such embodiment allows to use the device both as one of the modules of a modern universal microscopic platform and in the composition of special devices, for example, plants for a technological monitoring in the electronics industry. This module consists structurally of the modulation interferometer blocked with modified microlens which is placed into a standard jack of the microscope turret assembly. The source of the laser lighting depending on its type can be either placed directly on the mentioned module or attached outside the microscope. The module photodetector is placed using the standard microscope jacks designed for television cameras and other photodetectors. The object can be investigated in white light or by using other microscopic equipment available for the given microscopic platform, after which the object investigation is performed according to the proposed method without rearranging the lens, without refocusing and retargeting by means of switching the optical path of the microscope to that receiving jack on which the receiver module is located.

The scheme shown in FIG. 2 can serve as an example of the apparatus implementation. In this case, a single-mode semiconductor laser with the frequency doubling is used as a source of a laser radiation, the laser working at the wavelength of 532 nm and having the power of 2 MW and the linear polarization. A combination of the polarizing beam splitter and the half-wave plate with the electromechanical servo is used as the adjustable beam splitter. The linear polarization filters of both polarization modulators are made in the form of Glann-Thompson prisms, the controlled retarders are made in the form of Babine-Soleil compensators with the linear electromechanical drive, and polarization rotators are made in the form of half-wave plates with the electromechanical servo. The element 12 designed for deflecting and mixing the reference and object beams is placed slantwise near the axis of the frontal lens of the microlens in the separation plane of two fragments of this lens, and is a translucent non-polarizing mirror film. The analyzer is made in the form of a film polarization element. The phase modulation is performed using a piezo-drive having an oscillation amplitude of about 0,6 µm and a frequency of about 5 kHz. A dissector with an electromagnet focusing-deflecting system (FDS) is used as the photodetector. The positioning of the standard fragment (pixel) in the image plane is performed using the FDS, the pixels being able to be positioned both within the whole screen and inside its fragment being arbitrary selected. The positioning of the pixels can be performed both with an arbitrary spatial separation and an arbitrary superimposing each other (including different superimposing in different coordinates).

All types of the modulation are performed in the parallel beams, thereby allowing radically to decrease the distortions introduced by the modulators into the phase-polarization structure of the beams. Supplying the object beam from the polarization modulator to the object plane avoiding the microlens through the single long-focus lens (collimator) with a minimal number of reflections allows to maintain its extremely high extinction unavailable for known polarization microscopic devices. An equally high extinction is maintained also in the reference beam, thereby ensuring in aggregate the unprecedentedly high level of the accuracy in determining the material optical constants.

A simplified version of the proposed microscope confirmed the validity of the proposed method was realized on the basis of the microscope DMR of the firm Leitz. A helium-neon laser having the power of 10 MW and the wavelength of 632.8 nm was used as the laser illumination source. A piezoelement was used as the phase modulator drive, the polarization modulation was performed by means of rearranging the half-wave and quarter-wave plates by hand. The redistribution of the illumination intensity was performed by means of introducing a neutral filter into the reference shoulder of the interferometer. The micro-aperture filter and controlled retarder did not utilized. The results of measurements performed at microobjects of different nature showed that the highest limit in the lateral resolution was of about 25 nm, a resolution in height was of about 0.5 nm. A lateral resolution at boundaries between materials having different refraction indices had also a value of about 25 nm, a location of the separation boundary between crystallites of the two-beam-refracting material having a great distinction in a direction of the optical axes was determined approximately with the same resolution. The lateral resolution was limited by dimensions of the dissector cut aperture and resulting increasing of the optical system, which determined a value of a virtual pixel. The vertical resolution was limited, on one hand, by a value of the chosen discrete in height (0.3 nm), and on other hand, by a microphonics level. Thus, the device resolution parameters can be improved appreciably not only by improving the interferometer optical system itself, which is rather difficult in a technological way, but also by optimizing an image projecting system, signal processing system parameters, and environment monitoring, which is not a serious problem.

The invention claimed is:

1. A method for determining the object microrelief and optical properties of the surface layer, including the steps of:
   performing a polarization modulation;
   splitting an input coherent, monochromatic polarized light flux into an object light beam exposing the object field through a microlens unit, and a reference light beam;
   performing a phase modulation of the reference beam;
   performing an interference mixing of the light beams;
   extracting two mutually orthogonal polarization components and obtaining an interferogram;
   positioning a pixel of said interferogram;
   converting an average illumination of said pixel into respective modulation signals;
   measuring an amplitude and phase of a variable component and a value of a constant component of a modulation signal of the respective modulation signals;

calculating phase, amplitude and a polarization parameter of light falling onto the pixel from the object beam;

calculating the object microrelief and optical material constants of the surface layer of the object, calculation results being held on a computer readable medium; wherein:

simultaneously with the step of splitting the light flux into the object and reference beams, light flux intensity is redistributed between the object and reference beams;

thereafter, polarization modulation is performed separately for the object beam and the reference beam;

object field exposure is performed by passing the object beam through a front surface of a frontal lens of the microlens unit;

before the step of measuring, a preliminary ratio of illumination between the reference and object beams is established, and preliminary phase and amplitude values of the object beam light falling onto the pixel being calculated;

after repeating the operation for a set of pixels, a step of equalizing illumination of one pixel by the object and reference beams is performed by redistributing intensity of the object and reference beams; thereafter, phase and amplitude of a variable component and a value of a constant component of the modulation signal is measured and refined phase and amplitude values of the object beam light falling on the pixel is calculated.

2. The method for determining the object microrelief and optical properties of the surface layer of claim 1, wherein the object field exposure is performed sequentially in two linearly independent polarization states.

3. The method for determining the object microrelief and optical properties of the surface layer of claim 1, further comprising the steps of:

performing additional refinement of the amplitude value of the object beam light falling onto the pixel by setting the phase of the reference beam light opposite with respect to the phase of the object beam light falling onto the pixel;

performing amplitude modulation by changing the intensity ratio between the object light beam and the reference light beam and determining two different intensity ratios between the object light beam and the reference light beam corresponding to the same illumination of the pixel; and calculating a fraction of the light at the pixel caused by the object beam with respect to total light falling on the pixel.

4. The method for determining the object microrelief and optical properties of the surface layer of claim 1, further comprising the steps of:

setting additionally the reference beam phase in phase with the light falling onto the pixel from the object beam;

performing the polarization modulation of the object beam continuously;

measuring the polarization modulation signal; and calculating phases and amplitudes of harmonic components of said polarization modulation signal, by which phases and amplitudes are calculated the parameters of optical anisotropy of the object surface layer.

5. The method for determining the object microrelief and optical properties of the surface layer of claim 1, further comprising the steps of:

performing the polarization modulation of the object beam and reference beam with a simultaneous phase modulation of said reference beam, a frequency of object beam phase modulation being either higher or lower than the frequency of the polarization modulation of the beams;

measuring the phases and amplitudes of the harmonic components of signal envelopes; and calculating the microrelief parameters and optical material constants including all parameters of optical anisotropy of the object surface layer.

6. A modulation interference microscope having: a laser; a modulation interferometer having a phase modulator, collimator optically connected with a polarization modulator and a beam splitter; a microlens unit, telescope, polarization analyzer unit and photodetector mounted along a single optical axis; a controlling and signal processing unit designed to be connected to a computer through an exchange bus; further comprising:

a spatial micro-aperture filter;

an element designed for deflecting and mixing the light beams and located on the optical axis; and a phase compensator;

the modulation interferometer being provided with a second collimator optically connected with a second polarization modulator by means of a system of deflecting optical elements;

the beam splitter being made adjustable and having one output coupled in series through the deflecting optical elements of the system with the phase modulator, the polarization modulator, the collimator and one side of the element designed for deflecting and mixing the light beams, and having other output coupled with the phase compensator, the second polarization modulator, the second collimator and an opposite side of said element.

7. The modulation interference microscope of claim 6, wherein the element designed for deflecting and mixing the light beams is made in the form of two-sided flat mirror placed at an angle to the optical axis.

8. The modulation interference microscope of claim 7, wherein the mirror is made translucent.

9. The modulation interference microscope of claim 7, characterized in that the mirror is made non-transparent.

10. The modulation interference microscope of claim 6, wherein the element designed for deflecting and mixing the light beams is located inside a frontal lens of the microlens unit.

11. The modulation interference microscope of claim 6, wherein the polarization modulator is made in the form of a linear polarization filter, a controlled compensator and a polarization plane rotating unit, which are optically connected and arranged in series.

12. The modulation interference microscope of claim 6, wherein the phase modulator is placed at a non-orthogonal direction with respect to the optical axis, and the interferometer is additionally provided with at least one turning mirror placed between the phase modulator and one of the elements of the system of deflecting optical elements.

* * * * *